(12) United States Patent
Miller et al.

(10) Patent No.: US 7,137,202 B2
(45) Date of Patent: Nov. 21, 2006

(54) ASSEMBLING COMPOSITE STRUCTURES

(75) Inventors: Keith E Miller, Bristol (GB); Robert J Simmonds, Bristol (GB)

(73) Assignee: Airbus UK Limited, Bristol (GB)

( * ) Notice: Subject to any disclaimer, the term of this patent is extended or adjusted under 35 U.S.C. 154(b) by 408 days.

(21) Appl. No.: 10/169,912

(22) PCT Filed: Feb. 6, 2001

(86) PCT No.: PCT/GB01/00471

§ 371 (c)(1),
(2), (4) Date: Jul. 11, 2002

(87) PCT Pub. No.: WO01/58753

PCT Pub. Date: Aug. 16, 2001

(65) Prior Publication Data

US 2003/0000077 A1   Jan. 2, 2003

(30) Foreign Application Priority Data

Feb. 8, 2000  (GB)  ................................. 0002837.3

(51) Int. Cl.
*B21D 53/88* (2006.01)
(52) U.S. Cl. .................. 29/897.2; 29/799; 29/464
(58) Field of Classification Search ............... 29/897.2, 29/281.5, 434, 464, 799; 244/123, 124; 269/21, 269/37; 156/212, 221
See application file for complete search history.

(56) References Cited

U.S. PATENT DOCUMENTS

| 2,831,522 | A | | 4/1958 | La Vista |
| 3,094,958 | A | | 6/1963 | Gruetjen |
| 4,527,783 | A | * | 7/1985 | Collora et al. ................. 269/21 |
| 4,603,466 | A | * | 8/1986 | Morley ......................... 269/21 |
| 4,684,113 | A | * | 8/1987 | Douglas et al. ............... 269/21 |
| 4,928,936 | A | * | 5/1990 | Ohkubo et al. ............... 269/73 |
| 4,995,146 | A | * | 2/1991 | Woods ....................... 29/281.3 |
| 5,080,742 | A | * | 1/1992 | Takahashi .................... 156/212 |
| 5,239,753 | A | | 8/1993 | Kalis et al. |
| 5,249,785 | A | * | 10/1993 | Nelson et al. ................. 269/21 |
| 5,842,690 | A | * | 12/1998 | Lee et al. ...................... 269/21 |
| 6,170,157 | B1 | * | 1/2001 | Munk et al. ................ 29/897.2 |
| 6,190,487 | B1 | * | 2/2001 | Laughlin ..................... 156/213 |
| 6,224,706 | B1 | * | 5/2001 | Matich ........................ 156/212 |
| 6,672,576 | B1 | * | 1/2004 | Walker .......................... 269/21 |

FOREIGN PATENT DOCUMENTS

| WO | WO9709166 | * | 3/1997 | ................. 156/212 |
| WO | 9946079 | | 9/1999 | |

* cited by examiner

*Primary Examiner*—Marc Jimenez
(74) *Attorney, Agent, or Firm*—Nixon & Vanderhye P.C.

(57) ABSTRACT

Apparatus and a method for assembly of panels into a composite structure are provided. The structure includes a form jig (1) having form boards (3, 4, 5) defining forming edges (6, 7, 8) against which a composite panel to be precisely formed may be drawn by a number of edge clamps (12), usually in combination with suction devices (26, 27, 28, 29, 30). The edge clamps (12) are able to extend around edges of the panel (13) for initial location of the panel against the form boards and subsequent more powerful drawing action to draw the panel into intimate contact with the forming edges of the form boards.

31 Claims, 4 Drawing Sheets

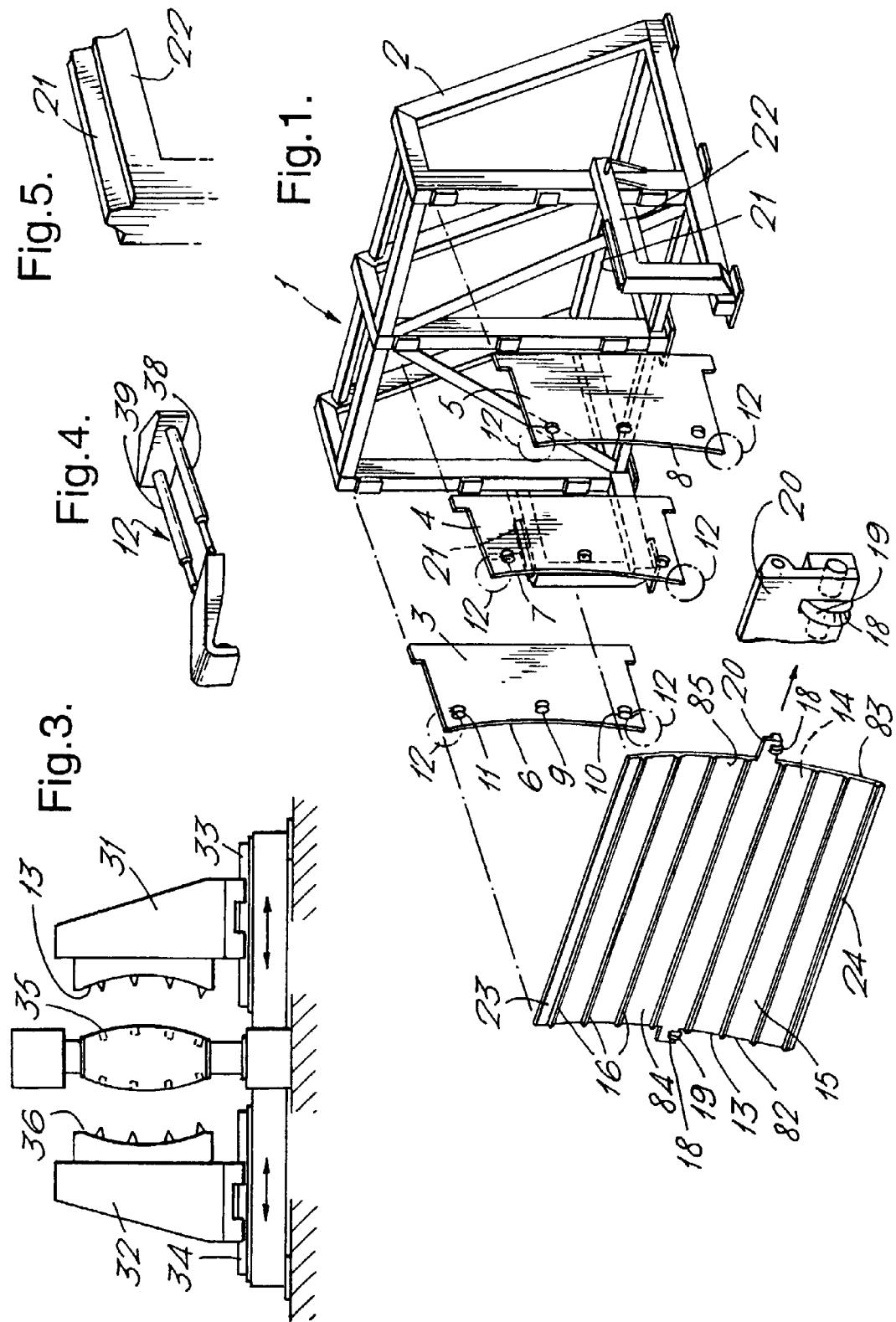

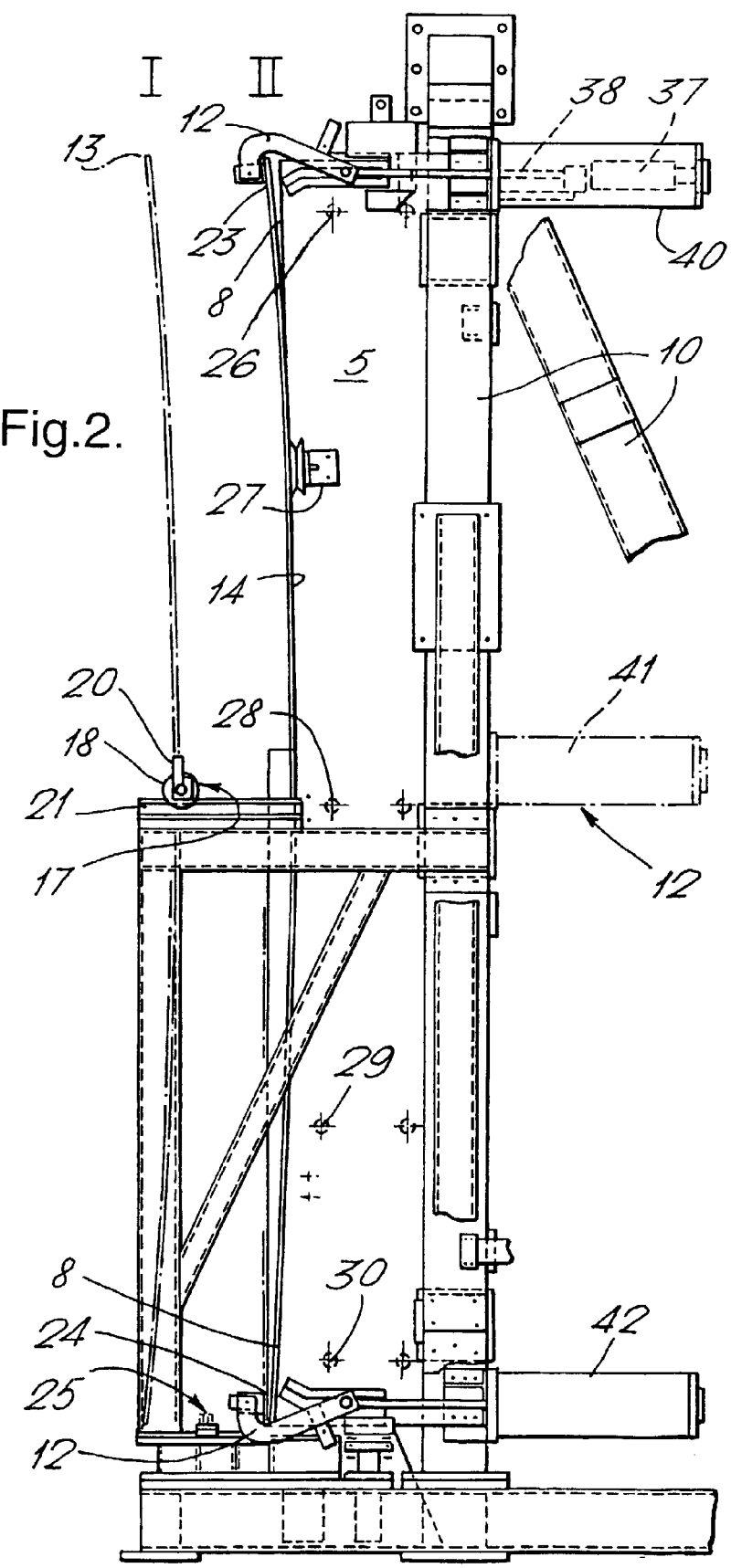

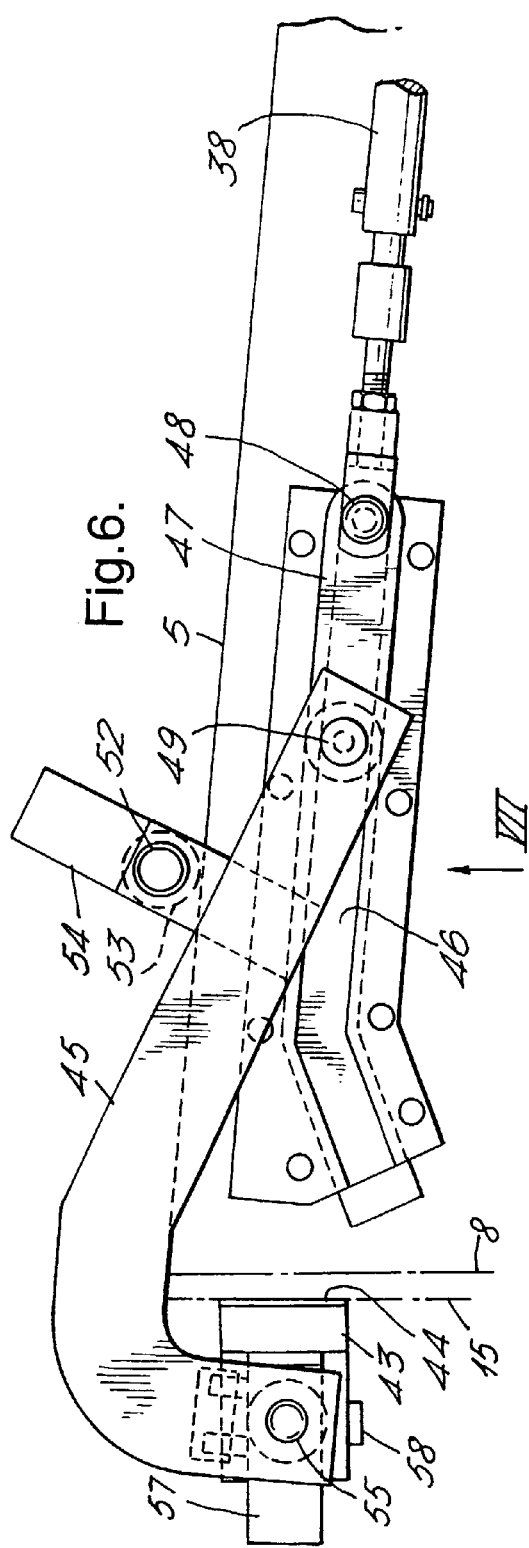
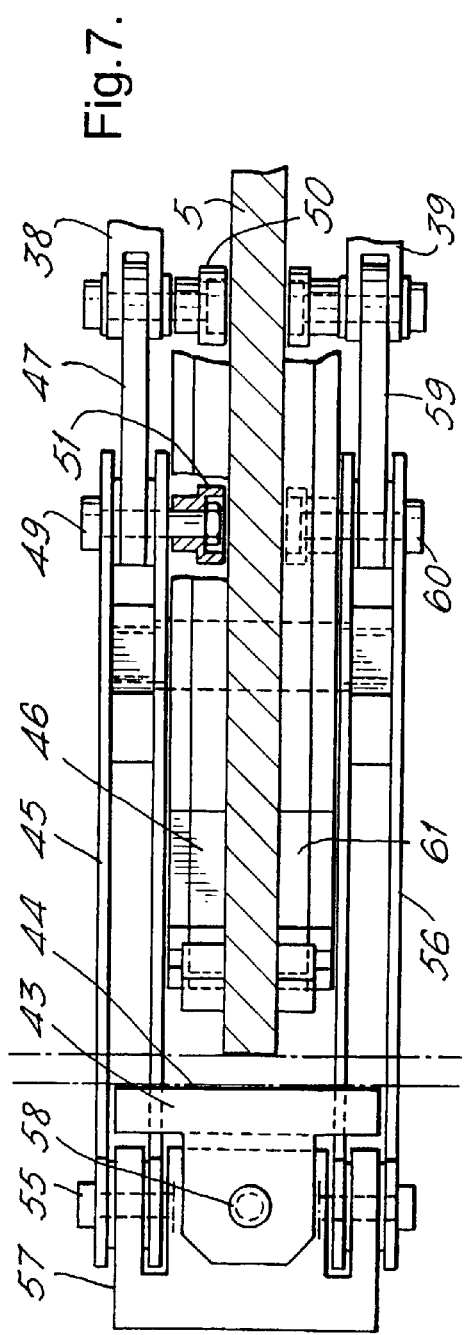

ASSEMBLING COMPOSITE STRUCTURES

This application is the U.S. national phase of international application PCT/GB01/00471 filed 06 Feb. 2001, which designated the U.S.

This invention relates to a method and apparatus for assembling a composite structure, in particular for forming a composite panel accurately to a pre-determined shape for assembly into such a structure.

It is known to assemble metallic structures, in particular metallic aircraft structures such as wing boxes, by first constructing part of a wing box comprising spanwise extending front and rear wing spars separated by a series of wing ribs extending chordwise between spars. Wing skin panels are offered up to the rib and spar sub-assembly and are pressed firmly against contour edges or surfaces of the ribs prior to fastening of the panel to the ribs. In this known process the panel does not take up its final shape, or "profile", until it has been pressed into intimate contact with the profile surfaces of the ribs. This assembly process is not suitable for use with composite materials such as carbon fibre reinforced resin composite panels. One reason is because such composite panels cannot be effectively pressed into contact with wing ribs owing to the generally stiffer nature of such composite panels caused by their generally greater thickness than equivalent metallic panels. Hence the fitting of such composite panels to wing ribs normally requires the use of shims inserted between panel and rib to ensure intimate contact between the panel and the ribs. Nevertheless a precise aerodynamic profile for the external surface of the panel is required and thus the panel must be held in a configuration which conforms with this precise aerodynamic profile whilst it is assembled to the sub-assembly of ribs and spars.

It is an object of the invention to provide an apparatus and method for achieving this precise panel profile both prior to and during assembly of the panel on to a supporting sub-assembly or structure.

According to one aspect of the present invention there is provided composite structure assembly apparatus including a form jig having at least one former for drawing a composite panel to a required form and supporting the panel in that form for subsequent operations on the panel wherein the apparatus includes at lease one edge clamp to draw the panel towards the at least one former. The use of edge clamps enables the required level of force to be applied to edges of the panel previously unavailable with such well known drawing devices as suction cups.

The at least one edge clamp may be adapted initially to reach around an edge of the panel and to engage a rear surface of the panel facing away from the jig, prior to the said drawing of the panel towards the jig.

The at least one edge clamp is preferably adapted firmly to draw an edge region of the panel into intimate contact with the at least one former.

The at least one edge clamp desirably has a drawing stroke of at least substantially 70 mm. In this way the edge clamps will be able to extend forwardly and then around the panel edges, using a stroke of greater length than would be available using suction devices where the stroke is normally limited to say 20 mm.

The at least one edge clamp may include a transport mechanism and panel engagement means, wherein the transport mechanism moves the panel engagement means along its stroke. A pivoting mechanism may be included to pivot the panel engagement means around a said panel edge into position to engage the rear surface of the panel.

The panel engagement means may include a panel engagement surface pivotable thereon to allow even contact of the panel engagement surface with the rear surface of the panel.

The edge clamp may be adapted to engage the rear surface of the panel via a panel stiffener which is attached to the rear surface of the panel. In this way load from the edge clamps may be spread more evenly across the panel.

The apparatus may include a series of suction devices adapted to engage a front surface of the panel to draw the panel into contact with the at least one former in conjunction with the edge clamp, and the suction devices may be adapted progressively to draw the panel into contact with the at least one former prior to the edge clamp drawing an edge region of the panel into intimate contact with the at least one former. In this way the composite panel will be progressively formed to a shape whereby the front surface of the panel is in intimate contact with the former and accurately takes up the desired aerodynamic profile. This progressive drawing of the panel into final shape, which is desirably from the centre of the panel outwardly, most effectively achieves the desired final shape of the panel without the need for any further adjustment of either the suction devices or the edge clamps.

Desirably the at least one former is shaped to form the front surface of the panel to a convex shape.

The at least one former preferably comprises a series of spaced form boards, each having an edge contoured to define part of the shape of the front surface of the panel.

The form boards are desirably spaced from one another sufficient to allow access to the panel for subsequent assembly operations, for example, fastening of the panel to the underlying wing ribs.

The at least one said suction device is desirably mounted on a form board, for reasons of simplicity and compactness of the jig structure. Additionally, the mounting of the suction devices on the form boards is generally efficient in respect of the transmission of drawing forces from the suction devices into the jig structure whilst the mounting of the suction devices near to the contoured edges helps to prevent out-of-plane form board distortion.

The suction devices may be at least partly mounted in pairs, one on either side of a said form board, to equalise drawing forces about the plane of the form board and thereby prevent form board distortion.

At least one suction device may mounted within a cutout in a said form board whereby the drawing force which the suction device exerts on the panel will be transmitted into the jig within the plane of the form board.

The apparatus desirably includes location means substantially to prevent movement of the panel in directions substantially within the plane of the panel.

The location means may be disposed generally centrally of the panel along at least one edge thereof, when in the jig, whereby accurately to locate the centre of the at least one edge of the panel with respect to a fixed datum.

The location means advantageously comprises a wheel and slide arrangement in which one of the wheel and slide is affixed to the panel and the other is affixed to the jig whereby forming movement of the panel will cause movement of the wheel along the slide.

The wheel and slide may have co-operating V-shaped elements whereby to locate the wheel on the slide in a direction perpendicular to the direction of travel of the wheel along the slide.

In a preferred arrangement one element of the location means is affixed to a tab projecting from an edge of the panel. Such tabs may be machined away if desired, either following forming of the panel to shape, or following assembly of the panel to the structure.

The apparatus may include means to transport the formed panel to a structure to which the panel is to be attached. The transport means is desirably manufactured to act with precision and may comprise a track along which the jig and panel travel to the structure, for example a rail track.

The apparatus in one embodiment includes means centrally to support the structure and a pair of said jigs disposed one on each side thereof. In this way wing panels may be drawn to shape on either side of a centrally disposed rib and spar sub-assembly and offered up to the sub-assembly from both sides simultaneously, for speed of assembly.

According to a second aspect of the invention there is provided a method of assembling a composite structure including the steps of supporting a panel in a generally vertical plane in close proximity to a form jig; operating edge clamps on the form jig to extend around peripheral edges of the panel and draw the panel loosely against the jig; operating sequentially a series of further drawing devices such as suction devices on the jig to commence drawing the panel into intimate contact with the jig; operating again the edge clamps to complete the drawing of the panel into the said intimate contact with the jig, and assembling the formed panel to a further part of the composite structure.

The panel is preferably drawn from a first shape of greater surface curvature to a second shape of lesser surface curvature conforming to at least one former on the form jig.

The invention will now be described in greater detail by way of example with reference to the accompanying drawings in which:

FIG. 1 is an exploded three dimensional view of apparatus according to the invention;

FIG. 2 is a side cutaway view of similar apparatus according to the invention;

FIG. 3 is a side view of a third embodiment of apparatus according to the invention;

FIG. 4 is a three dimensional embodiment of an edge clamp for use in the apparatus of FIG. 1;

FIG. 5 is a three dimensional view of panel location means for use in the apparatus of FIG. 1;

FIG. 6 is a side view of an alternative edge clamp arrangement according to the invention;

FIG. 7 is a view in the direction VII of FIG. 6;

Figure 10:
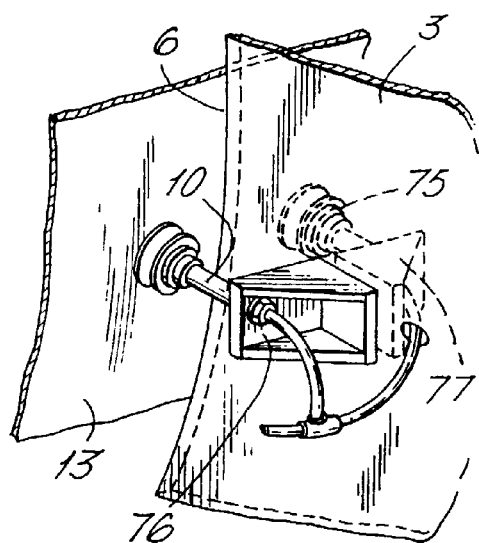
FIG. 10 is a three dimensional view of an alternative mounting for suction devices according to the invention.

Referring to FIG. 1, apparatus according to a first embodiment of the invention is shown in the form of a form jig 1 comprising a support structure 2 supporting three form boards 3, 4, 5 each having an aerodynamic profile defining forming edge 6, 7, 8 and supporting a series of suction devices 9, 10, 11 and edge clamps (see FIG. 4) 12. Edge clamps are positioned at all six corners indicated of the form boards 3, 4, 5. Suction cups (not shown) are positioned on the unseen sides of the form boards 3, 4, 5 in opposed relationship to the suction devices 9, 10, 11 in order to ensure that symmetrical drawing forces are transmitted into the form boards via the suction devices. Such a symmetrical arrangement is shown in FIG. 10 where like reference numerals have been applied to like objects for consistency.

Also shown in FIG. 1 is a carbon fibre reinforced composite wing skin panel 13. The panel has a convex aerodynamic surface 14 and a concave interior surface 15 stiffened by stringers 16. The panel 13 is supported, generally vertically, at a small distance from the forming edges 6, 7 and 8 of the form boards 3, 4, 5 where it is "captured" by the edge clamps 12 and drawn loosely into contact with the forming edges 6, 7 and 8. Location of the panel in the vertical sense is determined by location means 17 (see FIGS. 2 and 5). The location means comprise a wheel 18 having a V-shaped groove 19 rotatably attached to a tab 20 on the panel which engages with a V-shaped roller track 21 mounted on a support 22 on the form jig 1. A location means is positioned at either end of the panel as indicated. The location means serve precisely to determine the vertical positioning of the panel on the form jig so that when it is offered up to a wing rib and spar subassembly its location centrally of an aperture which is to fill will be accurately determined, preferably at least chordwise of the wing, but desirably spanwise as well.

The positioning of the six edge clamps 12, where indicated, at the corners or the form boards 3, 4, 5, ensures that the best possible leverage can be obtained on the panel to draw it from its initial shape of greater than required curvature to the required aerodynamic profile of lesser curvature. It will be appreciated that the aerodynamic or "front" surface 14 of the panel will be the surface accurately to be formed by the forming edges 6, 7 and 8 of the form boards when the aerodynamic surface is drawn into intimate contact therewith by the suction devices 9, 10, 11 and subsequently edge clamps 12. The suction devices are programmed to operate sequentially from the centre of the panel outwards in order progressively to draw the panel against the forming edges 6, 7, 8. For example suction devices 9 on each form board are likely to be operated first, followed at the same time by suction devices 10 and 11 on each form board. Following the operation of all the suction devices the edge clamps 12 will all operate together to complete their drawing stroke and ensure edge regions 23, 24 of the panel are drawn hard against co-operating portions of the form boards.

Referring to FIG. 2, a side view of apparatus similar to that of FIG. 1 is shown. Like items have been given like reference numerals for consistency. In this figure the edge clamps 12 are shown more fully. Also the skin panel 13 is shown in two positions, position I and position 11. In position I the panel 13 is suspended on location means 17 again comprising a grooved wheel 18 running on a V-shaped roller track 21, the wheel again being rotatably attached to a tab 20 extending from either side of the panel. If necessary, whether for reasons of steadying a large panel or load distribution, or whatever other reason, a lower slide support 25 disposed on either side of the panel may be employed to support the lower edge of the panel in conjunction with or separately from the location means 17. In any event, the panel once supported is rolled from position I to position II manually. At position II edge clamps 12 at the top of the panel extend upwardly and to the left of the page and those at the lower edge of the panel extend downwardly and to the left of the page. Those at the centre of the side edges 82, 83 of the panel will extend into and to the left and out of and to the left of the page, respectively, (see FIG. 1). The clamps then extend towards the centre of the panel and behind it, as shown in the figure, and draw the panel loosely against forming edges 6, 7, 8 of the form boards 3, 4, 5. In this position, as shown in FIG. 2, suction devices 26, 27, 28, 29, 30 (all but one shown only by their centre line) are positioned within range of the panel, i.e. within approximately 20 mm of the panel in all cases, and extend into contact with the panel and have suction applied to them. The suction devices then draw the panel to the right as far as they are able before all the edge clamps 12 are again operated, this time with a more powerful action, to draw the edge regions 23, 24 of the panel hard against the form boards 3, 4, 5. The aerodynamic profile-defining surface 14 of the panel is now in its final form and the panel is now ready to be offered up to a rib/spar sub-assembly 35 for fitting thereto (see FIG. 3). It will be seen from FIG. 3 that a pair of structures 31, 32, similar to the structures 10 of FIGS. 1 and 2 are shown mounted for rolling movement on tracks 33, 34 for movement in the direction of the arrows. It will be seen from FIG. 3 that it is then a simple matter to roll each structure 31, 32 towards the sub-assembly 35 for fitting of the panels 13, 36 to the sub-assembly 35. Each panel is initially offered up to the subassembly the ribs of which will have been deliberately machined undersize. Appropriate thickness shims are then inserted before each panel is finally affixed to the ribs of the sub-assembly. It will be apparent from the above that each panel 13, 36, once formed on its structure 31, 32, will maintain its profile-defining shape until finally affixed to the sub-assembly 35. Centralised location of each panel on its jig is maintained by the location means 17. Once each panel is affixed to the sub-assembly 35 the suction devices and edge clamps can be released leaving each panel in final aerodynamic profile-defining form securely affixed to the sub-assembly 35 thereby forming a completed wing box assembly.

It will be noted from FIG. 3 that the use of two form jigs or structures 31, 32 at the same time serves to significantly reduce the assembly time for this stage in the wing box assembly operation.

Accurate location of each panel 13, 36 in relation to the sub-assembly 35 before the final fixing takes place may be accomplished in various suitable ways for example sighting devices may be used where, for example a three dimensional computer-generated model exists. Alternatively mechanical stops may be used either between each form jig and a sub-assembly or on the tracks 33, 34, as desired.

Turning now to FIGS. 2, 6 and 7 for a fuller explanation of the working of the edge clamps 12, these clamps are each powered by a pneumatically actuated piston and cylinder 37. The piston and cylinder, together with connecting rods 38, 39 are housed within cylindrical casings 40, 41, 42 attached to the structure 10 of the jig. Apart from a panel contacting member 43 having a panel contacting surface 44 and a spacer block 57, each edge clamp 12 is formed in two halves. Each half is adapted to operate on one side of its form board. Thus, the edge clamp comprises symmetrical components disposed on either wide of its form board. Referring to FIG. 6, a hook portion 45 of the edge clamp runs in a guide track 46 for operation by the connecting rod 38 via a link 47. The link 47 has a first pivotal connection 48 to the connecting rod 38 and a second pivotal connection 49 to the hook portion 45. Pivotal connections 48 and 49 on the link 47 also connect with rollers 50, 51 (see FIG. 7) which run in the track 46.

The hook portion 45 has a third pivotal connection 52 which is connected to a further roller 53 engaged in a rising track 54 (shown schematically).

The panel contacting member 43 is pivotally mounted at 55 to hook portions 45 and 56 via the spacer block 57. A central pivotal mounting 58 effectively creates a Hook joint between the panel contacting member 43 and the hook portions 45 and 56 to ensure that the panel contacting surface 44 is always able to engage the panel 13 across the whole of the contact surface whereby evenly to apply load into the panel.

When the edge clamp first engages the panel 13 in position II (see FIG. 2) it is necessary for the connecting rods 38, 39 to move to the left. This, via links 47, 59 (see FIG. 7), moves the pivotal mountings 49, 60 to the left along the tracks 46, 61. In turn the further rollers 53, (not shown) are caused to rise up the rising tracks 54, (not shown) thereby lifting the hook portions 45, 56 upwardly clear of the incoming panel. It will be appreciated that for edge clamps positioned at the lower and side edges of the panel that the hook portions will be caused to move downwardly and sideways, respectively. For the lower edge clamps some form of return spring arrangement is likely to be required to bias the hook portions 45, 56 towards the track 46, 61, owing to the lack of gravitational assistance.

Once the panel 13 has been moved to position II the push rods 38, 39 are moved again to the right to the positions shown in FIGS. 6 and 7 allowing the further rollers 53, (not shown) to run back down the rising tracks and the panel contacting member 43 to move inwardly behind the panel 13. Further movement of the connecting rods to the right engages the panel contacting surface into contact with the rear surface 15 of the panel, then to urge the panel somewhat to the right towards the forming edges 6, 7, 8 of the form board (see FIG. 2). At this stage however the force exerted by the edge clamps on the panel is insufficient fully to draw the panel into contact with the form boards along the entire vertical length of the panel. At this point the suction devices 26, 27, 28, 29, 30 are caused to engage the aerodynamic surface 14 of the panel and to draw it at least partially into intimate contact with the forming edges 6, 7, 8 of the form boards. Further movement to the right of the connecting rods 38, 39 of each edge clamp then draws the edge regions 23, 24 (also edge regions 84, 85 (see FIG. 1) along side edges of the panel) into intimate contact with the forming edges 6, 7, 8 of the form boards along the entire length of the panel. The panel is now ready to be offered up to the sub-assembly 35 (see FIG. 3). It will be noted that the spacing between the form boards 3, 4 and 5 (see FIG. 1) allows ready access to the aerodynamic surface 14 of the panel by operators to carry out fitting and fixing operations.

It will further be noted that the positioning of the edge clamps 12 in an evenly spaced fashion around the edges of the panel enables the maximum possible drawing force to be imposed upon the panel in the most efficient manner to deflect it into intimate contact with the form boards. It will also be noted from the symmetrical form of the edge clamps and their symmetrical mounting about the form boards that no distortion of the form boards in an out-of-plane direction will tend to occur when drawing forces are imposed on the panel by the clamps.

Figure 8:
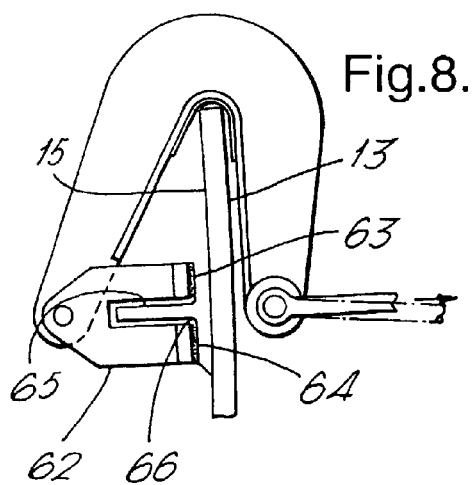
FIG. 8 is a side view of a further embodiment of an edge clamp according to the invention.

Referring now to FIG. 8, an alternative design of edge clamp is shown in which a panel engaging member 62 is bifurcated having two panel engaging surfaces 63, 64 adapted to pass either side of a stringer web 65 of a stringer 66 attached to the interior surface 15 of the panel 13. In this way drawing loads applied to the panel may be more evenly distributed through the panel. This embodiment is particularly beneficial with thick panels when higher drawing forces may be required.

Figure 9:
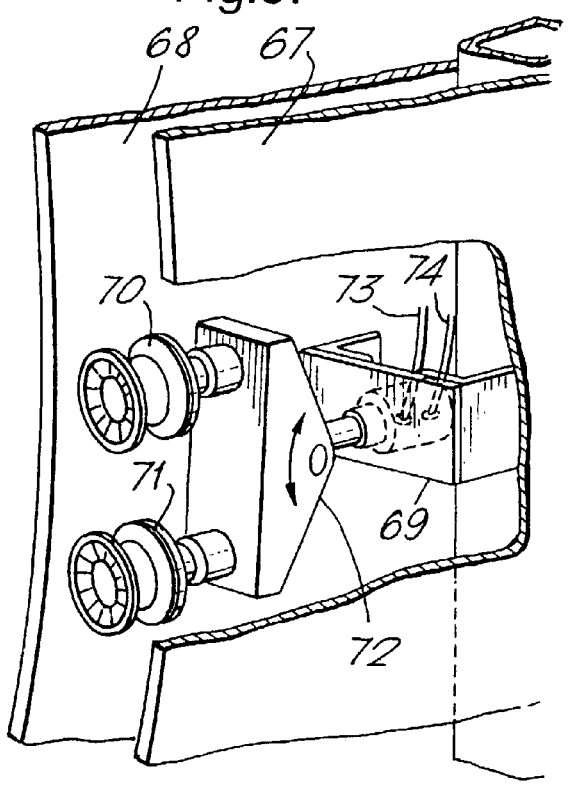
FIG. 9 is a three dimensional view of one embodiment of a suction device according to the invention mounted between two form boards.

Referring to FIG. 9, closely spaced form boards 67, 68 have a bracket 69 extending between them from which is mounted a pair of suction devices 70, 71 each mounted on a balance beam 72 to equalise drawing forces. Pneumatic pipes 73, 74 connect to a compressor (not shown) for applying suction to the suction devices. This arrangement is suitable where relatively high drawing forces are required and where, for design reasons, it is otherwise convenient to have two form boards relatively close together.

Referring to FIG. 10, a form board 3, shown in ghost, extends between a pair of suction devices 10, 75, each mounted to a bracket 76, 77. The brackets are suspended on opposite sides of the form board 3 and drawing forces transmitted through the suction devices 10, 75 will be transmitted symmetrically into the form board, thus avoiding distortion. An arrangement such as this is employed in the embodiment of FIG. 1 and FIG. 2.

Figure 11:
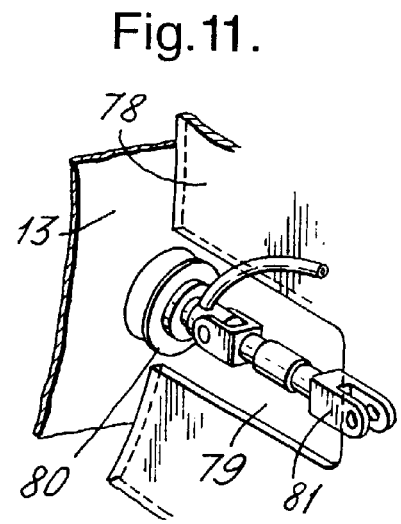
FIG. 11 is a three dimensional view of another mounting arrangement for a suction device according to the invention.

Referring to FIG. 11, a further arrangement for distributing drawing forces symmetrically into the form board is shown. In this embodiment a form board 78, again shown in ghost, has a cut-out 79. The cut-out receives a suction device 80 suspended from a fork 81 having a pin (not shown) passing through the form board 78. Once again, symmetrical distribution of drawing force is allowed by this arrangement. This arrangement is probably more suited to embodiments of the invention where lower drawing forces are required owing to the small possibility of form board distortion in the region of the cut-out if higher loadings are used. Nevertheless this arrangement provides a neat and simple installation which avoids asymmetric drawing forces being transmitted into the form board.

The method and apparatus of the invention thus provides a very practical means for forming composite panels to precise shape ready for offering up to sub-structures of which the panel is to form a part. The apparatus is robust, practical and very effectively allows operator access to the panel for further operations, with the panel held in the formed condition. Numerous positional variations of the suction devices and edge clamps can be foreseen within the scope of the invention for handling panels of different sizes, shapes and thicknesses. The principle of spaced form boards with suction devices and edge clamps mounted directly to the form boards provides extreme versatility and practicality to the operation of the invention.

From the embodiment of FIG. 2 it can be seen that the lower slide 25 can, where desired, provide precise vertical location of the panel where the position of the lower edge of the panel is critical.

Where desired, hydraulic or electric power may equally be used for the edge clamps.

It will be appreciated that aircraft sub-structures such as horizontal tail planes, tail fins also fuselages may equally be assembled according to the invention.

What is claimed is:

1. Composite structure assembly apparatus for holding a curved composite panel, said apparatus including:
    a form jig, having at least one former, said at least one former having a curvature less than the curvature of said panel, said form jig for drawing a composite panel to a required form and for supporting the panel in said required form for subsequent operations on the panel; and
    said form jig including a plurality of edge clamps, each edge clamp fordrawing the panel towards the at least one former.

2. Apparatus as in claim 1 in which said each edge clamp is adapted initially to reach around an edge of the panel and to engage a rear surface of the panel facing away from the jig, prior to the said drawing of the panel towards the jig.

3. Apparatus as in claim 2 in which said each edge clamp is adapted firmly to draw an edge region of the panel into intimate contact with the at least one former.

4. Apparatus as in claim 1 in which said each edge clamp is adapted firmly to draw an edge region of the panel into intimate contact with the at least one former.

5. Apparatus as in claim 1 in which said each edge clamp has a drawing stroke of at least substantially 70 mm.

6. Apparatus as in claim 1 in which said each edge clamp includes a transport mechanism and panel engager, wherein the transport mechanism moves the panel engager along its stroke.

7. Apparatus in claim 1 in which said each edge clamp includes a transport mechanism and panel engagement means wherein the transport mechanism moves the panel engagement means along its stroke.

8. Apparatus as in claim 7 in which the panel engagement means includes a panel engager surface pivotable thereon to allow even contact of the panel engager surface with the rear surface of the panel.

9. Apparatus as in claim 1 in which said each edge clamp is adapted to engage the rear surface of the panel via a panel stiffener attached to the rear surface of the panel.

10. Apparatus as in claim 1 including a series of suction devices adapted to engage a front surface of the panel to draw the panel into contact with the at least one former in conjunction with said each edge clamp.

11. Apparatus as in claim 10 in which the suction devices are adapted progressively to draw the panel into contact with the at least one former prior to said each edge clamp drawing an edge region of the panel into intimate contact with the at least one former.

12. Apparatus as in claim 10 in which the at least one former comprises a series of spaced form boards, each having an edge contoured to define part of the shape of the front surface of the panel and at least one said suction device is mounted on a form board.

13. Apparatus as in claim 12 in which a pair of suction devices are mounted, one on either side of a said form board, to equalise drawing forces about the plane of the form board and thereby prevent form board distortion.

14. Apparatus as in claim 12 in which at least one suction device is mounted within a cutout in a said form board whereby the drawing force which the suction device exerts on the panel will be transmitted into the jig within the plane of the form board.

15. Apparatus as in claim 1 in which the at least one former is shaped to form the front surface of the panel to a convex shape.

16. Apparatus as in claim 1 in which the at least one former comprises a series of spaced form boards, each having an edge contoured to define part of the shape of the front surface of the panel.

17. Apparatus as in claim 16 in which the form boards are spaced from one another sufficient to allow access to the panel for subsequent assembly operations.

18. Apparatus as in claim 1 including location means substantially to prevent movement of the panel in directions substantially within the plane of the panel.

19. Apparatus as in claim 1 including locater substantially to prevent movement of the panel in directions substantially within the plane of the panel.

20. Apparatus as in claim 19 in which the locater is disposed generally centrally of the panel along at least one edge thereof, when in the jig, whereby accurately to locate the centre of the at least one edge of the panel with respect to a fixed datum.

21. Apparatus as in claim 19 in which the locater comprises a wheel and slide arrangement in which one of the wheel and slide is affixed to the panel and the other is affixed to the jig whereby forming movement of the panel will cause movement of the wheel along the slide.

22. Apparatus as in claim 21 in which the wheel and slide have co-operating V-shaped elements whereby to locate the wheel on the slide in a direction perpendicular to the direction of travel of the wheel along the slide.

23. Apparatus as in claim 19 in which one element of the locater is affixed to a tab projecting from an edge of the panel.

24. Apparatus as in claim 1 including means to transport the formed panel to a structure to which the panel is to be attached.

25. Apparatus as in claim 24 in which the transport means includes a track along which the jig and panel travel to the structure.

26. Apparatus as in claim 25 including means centrally to support the structure and a pair of said jigs disposed one on each side thereof.

27. A method of assembling a composite structure utilizing the apparatus according to claim 1, including the steps of supporting said panel in a generally vertical plane in close proximity to said form jig;
   operating edge clamps on the form jig to extend around peripheral edges of the panel and draw the panel loosely against the jig;
   operating sequentially a series of suction devices on the jig to commence drawing the panel into intimate contact with the jig;
   operating again the edge clamps to complete the drawing of the panel into the said intimate contact with the jig, and
   assembling the formed panel to a further part of the composite structure.

28. A method as in claim 27 in which the panel is drawn from a first shape of greater surface curvature to a second shape of lesser surface curvature conforming to at least one former on the form jig.

29. An apparatus for assembling a composite structure including supporting a curved composite panel in a generally vertical plane in close proximity to a form jig wherein said form jig, has a curvature less than the curvature of the composite panel;
   means for operating edge clamps on the form jig to extend around peripheral edges of the panel and draw the panel loosely against the jig;
   means for sequentially operating a series of suction devices on the jig to commence drawing the panel into intimate contact with the jig; and
   means for tightening the edge clamps to complete the drawing of the panel into the said intimate contact with the jig, permitting the assembly of the formed panel to a further part of the composite structure.

30. Composite structure assembly apparatus, said apparatus including:
   a form jig, having at least one former, for drawing a composite panel to a required form and for supporting the panel in said required form for subsequent operations on the panel; and
   a plurality of edge clamps, each edge clamp for drawing the panel towards the at least one former, wherein the at least one former comprises a series of spaced form boards, each having an edge contoured to define part of the shape-of the front surface of the panel.

31. Composite structure assembly apparatus, said apparatus including:
   a form jig, having at least one former, for drawing a composite panel to a required form and for supporting the panel in said required form for subsequent operations on the panel; and
   a plurality of edge clamps, each edge clamp for drawing the panel towards the at least one former, wherein the at least one former comprises a series of spaced form boards, each having an edge contoured to define part of the shape of the front surface of the panel and at least one said suction device is mounted on at least one of said form boards.

* * * * *